United States Patent Office 3,740,244
Patented June 19, 1973

3,740,244
PROCESS FOR PRODUCING COLORED
PEARL ESSENCES
Nobumitsu Yano, Saitama-ken, Masao Fukushima, Itaru Fukinbara, and Masanori Kishi, Tokyo, and Kazuyoshi Kimura, Saitama-ken, Japan, assignors to Asahi Kasei Kogyo Kabushiki Kaisha, Osaka, Japan
No Drawing. Filed May 6, 1971, Ser. No. 140,955
Claims priority, application Japan, May 16, 1970, 45/41,297
Int. Cl. C08j 1/10
U.S. Cl. 106—291                         8 Claims

ABSTRACT OF THE DISCLOSURE

Crystals exhibiting pearl luster of various color tones (pearl essences) which have smooth surfaces and are uniform in size are obtained in high yields by crystallizing according to an ordinary procedure a compound selected from the group consisting of nucleic acid-related compounds, triazine compounds and basic lead carbonate from an aqueous solution of said compound in the presence of a water-soluble dye. The thus obtained colored pearl essences are incorporated into plastic materials or the like to provide coloring and decorative effects which cannot be attained by the use of dyes alone.

---

This invention relates to a process for producing in high yields crystals exhibiting pearl luster (pearl essence), which have smooth surfaces and are uniform in thickness and size and which have been colored with dyes, by crystallizing a compound selected from the group consisting of nucleic acid-related compounds, triazine compounds and basic lead carbonate from an aqueous solution of said compound in the presence of a water-soluble dye.

Generally, the conditions necessary for crystals to be pearl essences are that they should be high in refractive index, have smooth surfaces, be 5 to 100μ in size and 0.05 to 0.12μ in thickness, be chemically and optically stable and heat resistant, be insoluble in organic solvents, and be well dispersible in paints and the like.

With an aim to obtain crystals capable of satisfying the above-mentioned conditions, the present inventors made extensive studies to provide processes for the production of pearl essences in Japanese patent application Nos. 40,981/68, 2,930/69 and 22,700/69.

In order to obtain more excellent pearl essences, the inventors further have advanced their studies to find that crystals, which are more smooth in surface and more uniform in thickness and size than those obtained according to the conventional processes, can be produced in high yields by crystallizing a nucleic acid-related compound from an aqueous solution thereof in the presence of a water-soluble dye and, at the same time, that the said crystals have been colored with said dye to exhibit a colored pearl luster. When incorporated into a light-transmissible medium, the thus obtained crystals give a colored pearl essence composition which has such characteristics that the dye deposited on the crystal surfaces is not bled into the light-transmissible medium, and that the composition is free from various drawbacks which are possessed by iridescent pigments which have heretofore been known as a colored pearl essence. The pearl essence used in the name of iridescent pigment exhibits a color by the interference phenomenon of light, and is composed of a basic lead carbonate or a triazine compound such as melamine (Japanese patent application No. 26,128/69). Such iridescent pigments are required to have a thickness suitable to cause the interference of light, and, when incorporated into a light-transmissible medium, the crystals behave like interference films, despite the fact that they are not in the form of films but in the form of many particulate crystal particles. Owing to such properties, the iridescent pigments have been utilized for the purpose of enhancing the decorative effects of light-transmissible plastic products, film-forming materials, etc. As is well known, however, the iridescent pigments have many such drawbacks, for example, that since the colors of the iridescent pigments are interference colors developed by the interference phenomenon of light, the colors are restricted and cannot be made thick or light, that the colors disappear depending on visual angles, and that the colors vary depending on whether they are observed under reflected light or transmitted light. Further, the crystals of the iridescent pigments are required to have such a definite thickness that more than 80% of the crystals have a thickness within the range of the average thickness ±10%, and no interference color is developed in the case where the unevenness in thickness of the crystals is out of said range. Accordingly, if 2 or more kinds of iridescent pigments different in color are used simultaneously, the interference colors of the individual pigments deny each other to make it impossible to exhibit the desired colors. In order to incorporate 2 or more kinds of iridescent pigments into a light-transmissible medium without losing the color tones of the pigments, there have been brought about such drawbacks that the processing operations become extremely troublesome.

When the process of the present invention is compared with a process using no water-soluble dye, it is confirmed that the present process enables the production of crystals which are more smooth in crystal surface and more uniform in thickness and size, and thus the crystals are not only improved in quality, such as gloss and the like but also further increased in yield.

The present inventors have further found that the present process is applicable not only to the nucleic acid-related compounds but also to triazine compounds and basic lead carbonate which have been known as pearl essences.

In accordance with the present invention, the dye is used in the step of forming crystals of nucleic acid-related copounds, triazine compounds and basic lead carbonate, which exhibit pearl luster, to make it possible to obtain, in high yields, crystals which have a smooth surface and a uniform size and which exhibit pearl luster of various color tones. Thus, the present invention is quite novel.

Typical examples of nucleic acid-related compounds usable in the present process include 5'-uridylic acid, 5'-cytidylic acid, uridine, cytidine, uracil and cytosine which are of the pyrimidine type; 5'-inosinic acid, 5'-guanilic acid, 5'-adenylic acid, inosine, guanosine, adenosine, hypoxanthine, uric acid, xanthine, guanine and adenine which are of the guanine type. Other compounds as disclosed in DOS 2,001,504 laid open to public inspection on July 23, 1970 may also be used.

Typical examples of triazine compounds usable in the present invention include 2,4,6-triamino-s-triazine, 2,4,6-trihydroxy-s-triazine, 3-amino-5,6-dimethyl-as-triazine, 6-amino-s-triazine-2,4-diol, 2 - hydroxy - 4,6 - diamino-s-triazine, 4-amino-6-phenyl-s-triazinediol and 2,4-diamino-6-phenyl-s-triazine. Other triazine compounds as disclosed in DOS 1,963,750 laid open to public inspection on Aug. 13, 1970 may also be used.

In order to obtain a pearl essence from any of the above-mentioned compounds, at least one surface active agent is dissolved in an aqueous solution of the compound, and the compound is crystallized from the said solution in a conventional manner. As the surface active agent, a cationic, anionic or amphoteric surface active agent may be used, and the amount thereof is ordinarily 0.001 to 1% by weight based on the weight of the aqueous solution. As the crystallization procedure there may be adopted any of the known procedures, for example, cooling, varying the pH, or adding a solvent.

Crystals of basic lead carbonate may be prepared in a conventional manner. That is, aqueous ammonia is added to an aqueous lead acetate solution, and carbon dioxide gas is blown into the resulting solution. Thin flake-like crystals start to precipitate after several seconds. The introduction of carbon dioxide gas is continued while supplying ammonia to maintain the pH of the solution at 6.5 to obtain crystals having pearl luster (refer to Japanese patent publication Nos. 17,492/60, 6,969/62 and 17,142/62).

The crystals precipitated include, in some cases, crystals having a size larger than that satisfying the conditions for exhibiting pearl luster, though the conditions are varied depending upon the kind of starting materials (nucleic acid-related compounds, triazine compounds or basic lead carbonate), the size and thickness of crystals precipitated and the concentration of the crystals precipitated. When such larger crystals are present, the luster of the whole of crystals is lowered and hence the larger crystals are desired to be removed off. For this purpose, the solution containing crystals is allowed to stand for a certain period of time after the completion of crystallization (the period being varied depending upon the specific gravity of starting material and the difference in thickness of crystals contained), whereby crystals are classified by use of difference in precipitation speed.

The dye used in the present invention is a water-soluble dye, and includes water-soluble synthetic dyes such as basic dyes (e.g. Methylene Blue), acid dyes (e.g. Orange II), direct dyes (e.g. Congo Red) and vat dyes (e.g. Indigo); salts of metals such as chromium, copper, cobalt and iron; and water-soluble natural dyes. The kind, amount and time of addition of the dye used vary depending on the kind and color tone of the desired pearl essence. However, the dye is usually added in an amount of 0.001 to 0.5% by weight based on the weight of the solution.

When the colored pearl essence obtained according to the present invention is incorporated into a medium having a refractive index different by more than 0.2 from that of the pearl essence, it is possible to provide coloring and decorative effects which are not attainable when conventional dyes are used independently. Examples of the above-mentioned medium include organic solvents such as alcohols; film-forming media such as cellulose nitrate, cellulose acetate, cellulose acetate butyrate, ethyl cellulose, vinyl chloride polymers and copolymers, polystyrenes, alkyd resins and acrylic resins; and plastics such as polyethylene, casein, epoxy resins, acrylic resins, polyesters, phenol-melamine resins and urea-formaldehyde resins. Thus, the colored pearl essences according to the present invention can be successfully utilized particularly for the production of cosmetics, buttons, decorative plates, films, etc. Products blended with the colored pearl essence according to the present invention are not only more excellent in gloss and more abundant in color and color tone than products blended with conventional iridescent pigments which have been known as colored pearl essences, but also do not change in color tone even when visual angles are varied or even when observed under reflected light or transmitted light. Moreover, even when a mixture of 2 or more of the present pearl essences different in color is used, the color tone of the mixture is given, without change, to the products.

Since the colored pearl essences obtained according to the present process have such advantages as mentioned above, the present invention is advantageously applicable to various fields.

The present invention is explained in further detail below with reference to examples, but these are merely by way of illustration and not by way of limitation.

EXAMPLE 1

50 grams of white needle-like crystals of adenine (purity 98.5%) was dissolved at an elevated temperature in 500 ml. of 0.5 N hydrochloric acid to prepare a solution A. On the other hand, 0.5 g. of Anon BF (trade name for an amphoteric active agent) and 1 g. of Orange II were dissolved in 9 liters of distilled water to prepare a solution B. The solution A was poured at one time into the solution B with stirring, and the resulting liquid was adjusted to pH 2.8 by addition of a 0.1 N-caustic soda solution. The liquid temperature was lowered, while continuing the stirring, to 5° C over a period of about 2 hours to deposit fine crystals (less than $1\mu$) of adenine. At this stage, the stirring was discontinued and the liquid temperature was maintained at 5° C., whereby the fine crystals grew and, after about 5 hours, the reaction liquid exhibited a strong red pearl luster. Subsequently, the crystals in the reaction liquid were subjected to classification treatment to obtain 18 g. (in terms of pure crystals) of crystals having smooth surfaces which were about $20\mu$ in length, $3\mu$ in width and $0.08\mu$ in thickness.

For comparison, the same procedures as above were effected, except that the Orange II was not used, to obtain only 12 g. (in terms of pure crystals) of control crystals which were about $20\mu$ in length, $2-3\mu$ in width and $0.1\mu$ in thickness. As the result of microscopic observation, it was confirmed that the dye-incorporated crystals were more smooth in surface than the control crystals.

The thus obtained adenine crystals were recovered by filtration and sufficiently washed with ethanol to obtain crystals having a red pearl luster. 0.5 grams of these crystals were mixed with 10 g. of castor oil, 3 drops of Bergamot and 100 g. of ethanol, whereby a hair lotion exhibiting a red pearl luster could be prepared.

EXAMPLE 2

20 grams of a white powder of guanine (purity 97.0%) was dissolved at an elevated temperature in 9 liters of 0.5 N-ammonia water, and the ammonia in the resulting solution was volatilized in a boiling water bath to deposit fine crystals of less than $1\mu$ in size. At this stage, 0.2 g. of Methylene Blue was dissolved in the liquid. This liquid was filtered, and the filtrate was charged with 100 ml. of a 1% aqueous solution of Trax H–45 ,trade name for an anionic surface active agent) and then allowed to stand for about 10 hours in a cold chamber kept at 5° C., whereby the liquid came to exhibit a strong blue pearl luster. Subsequently, the crystals in the liquid were subjected to classification treatment to obtain 14 g. (in terms of pure crysals) of crystals having smooth surfaces which were about $10\mu$ in length, $5\mu$ in width and $0.07\mu$ in thickness.

For comparison, the same procedures as above were effected, except that the Methylene Blue was not used, to obtain only 10 g. of control crystals which were $10-15\mu$ in length, $5-10\mu$ in width and about $0.07\mu$ in thickness. As the result of microscopic observation, it was confirmed that the control crystals were more coarse in surface than the dye-incorporated crystals.

The thus obtained guanine crystals were collected by filtration, washed with ethanol, dehydrated by flashing operation and then dispersed in nitrocellulose. 20 parts by weight of the resulting dispersion was mixed with 10 parts by weight of dibutyl phthalate, 3 parts by weight of ethanol, 1 part by weight of butanol and 66 parts by weight of toluene to prepare a manicure liquid having a blue pearl luster. This manicure liquid was obviously strong in gloss than a manicure liquid prepared in the same manner as above by use of the control crystals.

EXAMPLE 3

20 grams of a white powder of hypoxanthine (purity 94.5%) was dissolved at an elevated temperature in 10 liters of 0.5 N-ammonia water. To the resulting solution was added 0.5 ml. of Rapyzol B-30 (trade name for an anionic surface active agent). Subsequently, the ammonia in the liquid was volatilized in a boiling water bath, whereby fine flake-like crystals of less than $1\mu$ in size were deposited. At this stage, 0.3 g. of Congo Red was dissolved in the liquid, which was then gradually cooled to 5° C. over a period of about 5 hours to deposit fine needle-like crystals. Thereafter, the liquid was maintained at 5° C. for about 2 hours with mild stirring, whereby a strong red streamline pattern was observed in the liquid. Subsequently, the crystals were subjected to classification treatment to obtain 12 g. (in terms of pure crystals) of crystals having smooth surfaces which were about $15\mu$ in length, $3\mu$ in width and $0.08\mu$ in thickness.

For comparison, the same procedures as above were effected, except that the Congo Red was not used, to obtain only 8 g. of control crystals which were about $15-20\mu$ in length, $2\mu$ in width and $0.08\mu$ in thickness. It was confirmed that the dye-incorporated crystals were more excellent in quality than the control crystals.

The thus obtained red colored pearl essence crystals were subjected to flashing operation to remove the liquid adhered to the crystal surfaces and then washed with ethanol to obtain a hypoxanthine paste. 10 parts by weight of the hypoxanthine paste was mixed with 15 parts by weight of bees wax, 10 parts by weight of lanoline, 4 parts by weight of carnauba wax, 2 parts by weight of bromic acid, 5 parts by weight of centanol, 49 parts by weight of castor oil, 4 parts by weight of ceresine and 1 part by weight of a perfume to prepare a lip stick. This lip stick was stronger in pearl luster than a lip stick prepared in the same manner as above by use of the control crystals.

EXAMPLES 4-13

30 grams of melamine (2,4,6-triamino-s-triazine) was dissolved at an elevated temperature in 1 liter of distilled water. In the resulting solution were dissolved 5 g. of sodium oleate and each of the dyes set forth in Table 1 (in an amount shown in Table 1). This solution was stirred and, when the temperature of the solution lowered to 50° C., the stirring was discontinued and the solution was allowed to stand for about 1 hour in a cold chamber kept at 5° C. to form a liquid exhibiting a strong pearl luster. Crystals in the thus formed liquid were subjected to classification treatment to obtain 18 to 21 g. of hexagonal crystals which were about $10\mu$ in length and $0.07\mu$ in thickness.

For comparison, the same procedures as above were effected, except that the dye was not used, to obtain only 14 g. of control crystals.

The thus obtained colored pearl essence crystals were subjected to flashing operation by use of nitrocellulose and butyl acetate, and then dispersed in dibutyl phthalate to a crystal concentration of 30%. The resulting dispersion was mixed with 2% by weight based on the weight thereof of a half-polymerized methyl methacrylic acid ester, and then subjected to ordinary casting by use of glass plates to prepare a decorative plate having a streamline pattern. The thus obtained product was excellent in luster, color and color tone as compared with a product obtained in the same manner as above by use of an iridescent pigment of melamine, and showed no change in color even when observed under reflected light or transmitted light.

TABLE 1

| Example | Dye | Amount of dye (g.) | Yield (g.) | Color of pearl essence |
| --- | --- | --- | --- | --- |
| 4 | Potassium bichromate | 3 | 18 | Yellow. |
| 5 | Chromic acid mixture | 0.1 | 20 | Light green. |
| 6 | do | 0.5 | 18 | Green. |
| 7 | do | 2.0 | 18 | Dark green. |
| 8 | Food Red No. 102 | 0.2 | 21 | Red. |
| 9 | Eosine / Food Yellow No. 4 | 0.2 / 0.2 | 20 | Brown. |
| 10 | China ink | 0.5 | 21 | Grey. |
| 11 | do | 1.0 | 20 | Black. |
| 12 | Brilliant Blue FCF | 0.2 | 18 | Blue. |
| 13 | Crystal Violet | 0.2 | 18 | Purple. |

EXAMPLE 14

A mixture comprising each 2 g. of the light green-, pink- and blue-colored pearl essences obtained, respectively, in Examples 5, 8 and 12 was incorporated into 2 kg. of a half-polymerized methyl methacrylic acid ester. The resulting mixture was treated in the same manner as in Examples 4-13 to prepare an acrylic pearl plate bearing a streamline pattern. This pearl plate exhibited a beautiful brilliant pearl luster in which light green, pink and blue colors had been mixed.

For comparison, an acrylic plate was prepared in the same manner as above by use of light green-, pink- and blue-colored iridescent melamine pigments. In the case of this plate, the colors of the individual pigments were denied each other to show only a white and somewhat dull luster.

EXAMPLE 15

20 grams of cyanuric acid (2,4,6-trihydroxy-s-triazine) was dissolved at an elevated temperature in 1 liter of distilled water, and the temperature of the resutling solution was lowered to 50° C. with stirring. At this stage, 10 g. of Alscope LN-40A (trade name for an anionic surface active agent) and 0.1 g. of Eriochrome Black T were added to the solution. Subsequently, the liquid was allowed to stand for about 2 hours in a cold chamber kept at 5° C., whereby the liquid came to exhibit a black pearl luster. Crystals in this liquid were subjected to classification treatment to obtain 10.5 g. (in terms of pure crystals) of crystals having smooth surfaces which were $10\mu$ in length, $5-7\mu$ in width and $0.08\mu$ in thickness.

For comparison, the same procedures as above were effected, except that the dye was not added, to obtain 8 g. of control crystals which were $15\mu$ in length, $5-10\mu$ in width and $0.1\mu$ in thickness. As the result of microscopic observation, it was confirmed that the control crystals were somewhat coarser in surface than the dye-incorporated crystals.

The thus obtained black pearl essence crystals were washed with methanol, dried and then mixed with 2% based on the weight thereof of polyester resin pellets. The resulting mixture was subjected to injection molding to obtain a polyester resin molded article exhibiting a black pearl luster.

EXAMPLES 16-20

In a mixture comprising 1 liter of a solution of 0.02 mole of lead acetate and 2 ml. of 5% ammonia water was dissolved each of the dyes set forth in Table 2 (in an amount shown in Table 2). Into the resulting solution, carbon dioxide was introduced for several seconds, whereby thin flake-like crystals were deposited. The reaction was continued with introduction of carbon dioxide, while feeding ammonia so as to maintain the solution at pH 6.5, to obtain hexagonal crystals having smooth surfaces and exhibiting a pearl luster which were about $15\mu$ in length and $0.07\mu$ in thickness. As the result of microscopic observation, it was confirmed that the thus obtained crystals were obviously smoother in surface than crystals obtained in the same manner as above, except that the dye was not added.

Subsequently, the colored pearl essence crystals were flashed with a low viscosity saturated polyester resin containing 5% by weight of an oleophilic nonionic surface active agent sorbitan monooleate, and then dried under reduced pressure at 50° C. for 3 hours. Thereafter, 10 parts by weight of the thus treated crystals were dispersed in 20 parts by weight of benzene, and the resulting dispersion was sufficiently mixed with 3 parts by weight of an oil-soluble phenol resin to obtain a pigment. This pigment was coated on a glass plate and gradually dried, so as to complete the vaporization of the solvent over a period of about 30 hours, to prepare a film.

All films prepared according to the above-mentioned procedures had colored pearl lusters and were more excellent in luster, color tone and color than films prepared in the same manner as above by use of iridescent pigments of basic lead carbonates.

TABLE 2

| Example | Dye | Amount of dye (mg.) | Color of pearl essence |
|---|---|---|---|
| 16 | Amaranth | 25 | Pink. |
| 17 | do | 50 | Red. |
| 18 | Orange I | 25 | Orange. |
| 29 | Indigo Carmine | 25 | Purple. |
| 10 | Naphthol Yellow S | 25 | Yellow. |

What is claimed is:

1. In a process for producing colored pearl essence by crystallizing a member of the group consisting of (1) nucleic acid related compounds, (2) triazines and (3) basic lead carbonate from an aqueous solution, the improvement comprising carrying out the crystallization in the presence of a water soluble dye and where said member is (1) or (2) also in the presence of a surface active agent and where said member is (3) forming the lead carbonate in situ whereby there are obtained colored pearl essences uniform in size, having smooth surfaces and dyed with said dyestuff.

2. A process according to claim 1, wherein said member crystallized is a nucleic acid-related compound selected from the group consisting of 5'-uridylic acid, 5'-cytidylic acid, uridine, cytidine, uracil, cytosine, 5'-inosinic acid, 5'-guanilic acid, 5'-adenylic acid, inosine, guanosine, adenosine, hypoxarthine, uric acid, xanthine, guanine and adenine.

3. A process according to claim 1, wherein said member crystallized is a triazine compound selected from the group consisting of 2,4,6-triamino-s-triazine, 2,4,6-trihydroxy-s-triazine, 3-amino - 5,6 - dimethyl-as-triazine, 6-amino-s-triazine-2,4-diol, 2-hydroxy - 4,6 - diamino-s-triazine, 4-amino-6-phenyl-s-triazinediol and 2,4-diamino-6-phenyl-s-triazine.

4. A process according to claim 1, wherein the water-soluble dye is a member selected from the group consisting of basic dyes, acid dyes, direct dyes and vat dyes.

5. A process according to claim 1, wherein the amount of the water-soluble dye is 0.5 to 0.001% by weight based on the weight of the aqueous solution.

6. A process according to claim 1, wherein only crystals, which have smooth surfaces and are 5 to 100$\mu$ in size and 0.05 to 0.12$\mu$ in thickness, are separated from the crude crystals by means of difference in precipitation speed.

7. A process according to claim 1 wherein said member is basic lead carbonate and the crystallization is carried out while forming the basic lead carbonate in situ by adding carbon dioxide to an aqueous ammoniacal solution of lead acetate.

8. A process according to claim 1 wherein said member is either (1) or (2).

References Cited

UNITED STATES PATENTS

| 1,689,842 | 10/1928 | Rauschenberg | 106—291 |
| 2,995,459 | 8/1961 | Soloway | 106—291 |
| 3,311,485 | 3/1967 | Duwell | 106—291 |

JAMES E. POER, Primary Examiner